(12) United States Patent
Hirson et al.

(10) Patent No.: US 8,931,278 B2
(45) Date of Patent: Jan. 13, 2015

(54) STEAM GENERATION SYSTEM

(75) Inventors: Geoffrey Hirson, Laguna Niguel, CA (US); Gus F. Shouse, Newport Beach, CA (US)

(73) Assignee: Powerdyne, Inc., Newport Beach, CA (US)

( * ) Notice: Subject to any disclaimer, the term of this patent is extended or adjusted under 35 U.S.C. 154(b) by 296 days.

(21) Appl. No.: 13/473,228

(22) Filed: May 16, 2012

(65) Prior Publication Data

US 2012/0291436 A1    Nov. 22, 2012

Related U.S. Application Data

(60) Provisional application No. 61/486,615, filed on May 16, 2011.

(51) Int. Cl.
*F01K 1/00* (2006.01)
*F22B 1/02* (2006.01)
(Continued)

(52) U.S. Cl.
CPC ............... *F01K 23/101* (2013.01); *C01B 3/06* (2013.01); *Y02E 60/364* (2013.01)
USPC ................. 60/670; 122/31.1; 110/345; 48/73

(58) Field of Classification Search
CPC ....... Y02E 20/18; F01K 25/08; F01K 21/047; F02C 3/28; F02C 5/02; F02C 3/305
USPC ............ 60/670, 780, 775, 39.12, 793, 39.26, 60/646, 657; 48/62 R, 89, 108, 90, 113, 48/73; 423/648.1–655; 122/31, 311, 32, 122/448.1, 448.11; 110/204, 215, 345
See application file for complete search history.

(56) References Cited

U.S. PATENT DOCUMENTS

| 4,770,109 A | 9/1988 | Schlienger |
| 5,136,137 A | 8/1992 | Schlienger |

(Continued)

FOREIGN PATENT DOCUMENTS

| CA | 2379892 A1 | 2/2001 |
| CN | 1268550 A | 10/2000 |

(Continued)

OTHER PUBLICATIONS

Schuey et al., LLW Processing and Operational Experience Using A Plasma ARC Centrifugal Treatment (PACT) System, WM'06 Conference, Feb. 26-Mar. 2, 2006, Tucson, AZ.

(Continued)

*Primary Examiner* — Hoang Nguyen
(74) *Attorney, Agent, or Firm* — Pepper Hamilton LLP

(57) ABSTRACT

A steam generation system delivers heats water and carbon dioxide at high temperatures in the presence of one or more plasma arc torches and converts the materials into hydrogen and carbon monoxide. The converted gas is delivered to a heat recovery steam generator ("HRSG") to produce steam, which may be used to power a steam turbine. Depending on the amount of steam and/or power desired, the system may use a control system to vary the flow, temperature and pressure of the gas delivered to the HRSG. The control system may do this by bringing additional torches on-line or off-line in the processing chamber, by adding unheated gas directly from a supply source, shunting the gas from the HRSG, and varying the flow of water delivered to the HRSG.

21 Claims, 5 Drawing Sheets

(51) Int. Cl.
  *F23J 1/00* (2006.01)
  *F01K 23/10* (2006.01)
  *C01B 3/06* (2006.01)

(56) References Cited

U.S. PATENT DOCUMENTS

| | | | |
|---|---|---|---|
| 5,138,959 | A | 8/1992 | Kulkarni |
| 5,541,386 | A | 7/1996 | Alvi et al. |
| 5,611,947 | A | 3/1997 | Vavruska |
| 5,673,635 | A | 10/1997 | Fowler |
| 5,725,616 | A | 3/1998 | Lynum et al. |
| 6,215,678 | B1 | 4/2001 | Titus et al. |
| 6,289,851 | B1 | 9/2001 | Rabovitser et al. |
| 6,372,156 | B1 | 4/2002 | Kong et al. |
| 6,505,567 | B1 | 1/2003 | Anderson |
| 6,810,821 | B2 | 11/2004 | Chan |
| 6,976,362 | B2 | 12/2005 | Sheppard et al. |
| 7,279,655 | B2 | 10/2007 | Blutke et al. |
| 7,384,619 | B2 | 6/2008 | Bar-Gadda |
| 2002/0000085 | A1 | 1/2002 | Hall et al. |
| 2003/0029796 | A1 | 2/2003 | Maekawa |
| 2006/0112639 | A1 | 6/2006 | Nick et al. |
| 2006/0201157 | A1 | 9/2006 | Villalobos |
| 2006/0233699 | A1 | 10/2006 | Mills |
| 2007/0017228 | A1 | 1/2007 | Surma |
| 2007/0186474 | A1 | 8/2007 | Rabovitser et al. |
| 2007/0253874 | A1 | 11/2007 | Foret |
| 2007/0266633 | A1* | 11/2007 | Tsangaris et al. ........... 48/197 R |
| 2008/0041829 | A1 | 2/2008 | Blutke et al. |
| 2008/0083701 | A1 | 4/2008 | Shao et al. |
| 2008/0147241 | A1* | 6/2008 | Tsangaris et al. ............. 700/273 |
| 2008/0184621 | A1 | 8/2008 | Clark |
| 2008/0202028 | A1 | 8/2008 | Tsangaris et al. |
| 2008/0209807 | A1 | 9/2008 | Tsangaris et al. |
| 2008/0222956 | A1 | 9/2008 | Tsangaris et al. |
| 2008/0223047 | A1 | 9/2008 | Oliver |
| 2008/0277265 | A1 | 11/2008 | Tsangaris et al. |
| 2008/0283153 | A1 | 11/2008 | Zurecki et al. |
| 2009/0133407 | A1 | 5/2009 | Sawyer |
| 2009/0307975 | A1 | 12/2009 | Wolf |
| 2010/0065781 | A1 | 3/2010 | Brothier |
| 2010/0229522 | A1 | 9/2010 | Kingzett |
| 2010/0298449 | A1 | 11/2010 | Rojey |
| 2011/0067376 | A1 | 3/2011 | Tompkins et al. |
| 2011/0212012 | A1 | 9/2011 | McAlister |
| 2011/0265698 | A1 | 11/2011 | Hirson et al. |
| 2012/0000115 | A1 | 1/2012 | Shastri |
| 2012/0070347 | A1 | 3/2012 | Bacon et al. |
| 2012/0121468 | A1 | 5/2012 | Tsangaris et al. |
| 2013/0200624 | A1 | 8/2013 | Hirson et al. |

FOREIGN PATENT DOCUMENTS

| | | |
|---|---|---|
| CN | 1810938 A | 8/2006 |
| EP | 1270508 A1 | 1/2003 |
| WO | WO 2005/005009 A2 | 1/2005 |
| WO | WO 2008/130260 A1 | 10/2008 |
| WO | WO 2009/156761 A2 | 12/2009 |
| WO | WO 2011/091327 A1 | 7/2011 |
| WO | WO 2011/140080 A2 | 11/2011 |
| WO | WO 2012/039751 A2 | 3/2012 |
| WO | WO 2012/064936 A1 | 5/2012 |
| WO | WO 2012/077198 A1 | 6/2012 |
| WO | WO 2012/158797 A1 | 11/2012 |
| WO | WO 2012/177666 A1 | 12/2012 |

OTHER PUBLICATIONS http://www.plascoenergygroup.com/our-solution/how-is-plasco-different/.

* cited by examiner

STEAM GENERATION SYSTEM

CROSS REFERENCE TO RELATED APPLICATIONS

This patent document claims priority to U.S. Provisional Application No. 61/486,615, filed May 16, 2011. The disclosure of the priority application is incorporated herein by reference in its entirety.

BACKGROUND

This document relates to a method and system for the production of steam that is suitable for use in power generation and other applications.

Greenhouse gas emissions from coal-fired power are significant and rapidly growing. The United States has been estimated to produce close to two billion tons of $CO_2$ per year from coal-burning power plants. Greenhouse gas emissions from coal-fired electricity, now 27 percent of total U.S. emissions, are projected to grow by a third by the year 2025.

This disclosure describes a method and system directed to reducing or eliminating the use of fossil fuel, as well as reducing or eliminating greenhouse gas and other emissions, in connection with power generation.

SUMMARY

A steam generation system operates in a closed-loop manner to deliver a supply gas to a processing chamber and heat the gas at high temperatures in the presence of one or more plasma arc torches. The supply gas is a gas that will not autoignite in the presence of the plasma arc torch. The supply gas is delivered to a heat recovery steam generator ("HRSG") to produce steam, which may be used to power a steam turbine. Depending on the amount of steam and/or power desired, the system may use a control system to vary the flow, temperature and pressure of the gas delivered to the HRSG. The control system may do this by bringing additional plasma arc torches on-line or off-line in the processing chamber, adding unheated supply gas directly from a supply source, shunting the heated supply gas away from the HRSG, and varying the flow of water delivered to the HRSG.

In an embodiment, a steam generation system includes a carbon dioxide source, a water source, a primary processing chamber, and a heat recovery steam generator. The primary processing chamber includes: a housing; a supply gas inlet that is fluidly connected to the carbon dioxide source and configured to receive carbon dioxide from the carbon dioxide source; a water supply inlet that is fluidly connected to the water source and configured to receive water from the water source; at least one plasma arc torch configured to heat the carbon dioxide and water in the primary processing chamber to a temperature of from about 180° C. to 20,000° C. and convert the carbon dioxide and water into hydrogen and carbon monoxide; and a primary processing chamber gas outlet. The heat recovery steam generator includes a heated gas inlet that is fluidly connected to the primary processing chamber gas outlet, along with a gas return that is fluidly connected to the supply gas inlet. The heat recovery steam generator receives heated gas from the primary processing chamber gas outlet and uses the heated gas to generate steam. The steam may be used to power a load such as a steam turbine that is used in power generation.

In some embodiments, the system also may include a first supply gas valve having a first supply gas valve actuator. The first supply gas valve may be in fluid connection with the supply gas source on an input side and the supply gas inlet on an output side. A second supply gas valve may have a second supply gas valve actuator and may be in fluid connection with the supply gas source on an input side and the heated gas inlet on an output side. The system may include system monitors that are configured to provide a data signal indicative of a system variable, along with an automated control system in data communication with the system monitors and in operative communication with the system monitors, the first supply gas valve actuator and the second supply gas valve actuator.

Optionally, a first pipe may be fluidly connected to the supply gas source and the primary processing chamber gas inlet. A second pipe may be fluidly connected to the primary processing chamber gas outlet and the processed gas inlet of the heat recovery steam generator. A third pipe may be fluidly connected to the processed gas return of the heat recovery steam generator and the heated gas inlet of the primary processing chamber. A vacuum source may be configured to impart a vacuum to any or all of the pipes, the primary processing chamber, and a gas chamber of the heat recovery steam generator.

The automated control system may include a processor and a physical memory device configured to store a set of processor readable instructions to direct the activity of the processor. The monitors may include a pressure monitor and/or a temperature monitor. The pressure monitor may be configured to detect a pressure of gas as the gas is delivered from the primary processing chamber's gas outlet to the process gas inlet of the heat recovery steam generator. The temperature monitor may be configured to detect a temperature of gas as it is delivered from the primary processing chamber's gas outlet to the process gas inlet of the heat recovery steam generator.

The first supply gas valve, in response to a command from the control system to the first supply gas valve actuator, may variably control a flow of carbon dioxide into the primary processing chamber. The second supply gas valve, in response to a command from the control system to the second supply gas valve actuator, may variably control a flow of carbon dioxide from the gas supply source to the heated gas inlet of the heat recovery steam generator. In some embodiments, the second supply gas valve may be a mixing valve.

Each plasma arc torch may include a programmable actuator in operative communication with the automated control system that, in response to a command from the processor, variably controls activation of its corresponding torch.

The system also may include a first programmable two-way shunt valve having a programmable first two-way shunt valve actuator in operative communication with the control system. The first shunt valve may be in fluid communication with the gas outlet and the second supply gas valve on an input side. The system also may include a second programmable two-way shunt valve having a programmable second two-way shunt valve actuator in operative communication with the control system. The second shunt valve may be in fluid communication with the supply gas inlet on an output side. The system also may include a shunt line in fluid communication with the first two-way shunt valve and the second two-way shunt valve. The first two-way shunt valve can be controlled by the system controller through the first two-way shunt valve actuator to direct a gas flow from the valve input side to either one of the processed gas input or the shunt line, and the second two-way shunt valve can be controlled by the system controller through the second two-way shunt valve actuator to direct a gas flow from either one of the processed gas return or the shunt line and to the output side of the second two-way shunt valve.

Optionally, the automated control system may include a water control valve having a water control valve actuator in operative communication with the control system that, in response to a command from the system controller, variably controls a flow of water into the heat recovery steam generator.

The system also may include a power source configured to deliver power to at least one of the plasma arc torches during a cold start. The power source comprises a generator or an automated transfer switch in electrical communication with an electrical power supply.

The system also may include a second heat recovery steam generator having a gas inlet in fluid communication with the gas return of the first heat recovery steam generator. The second heat recovery steam generator may receive gas from the first heat recovery steam generator and use the gas to generate steam. A connection valve may have a programmable connection valve actuator in operative connection with the control system. The connection valve may be in fluid connection with the processed gas return of the first heat recovery steam generator on an input side, and with the processed gas inlet of the second heat recovery steam generator on an output side.

In some embodiments, a method of generating steam may include: controllably delivering carbon dioxide and water to a primary processing chamber; controlling at least one plasma arc torch to heat the carbon dioxide and water in the primary processing chamber to a temperature that is from about 180° F. to about 36,000° F. and convert the carbon dioxide and water into an exhaust gas mixture comprising hydrogen and carbon monoxide; controllably mixing some volume of non-heated carbon dioxide with the exhaust gas thereby forming a gas mixture; delivering the gas mixture to an input of a heat recovery steam generator; and returning an exhaust from an output of the heat recovery steam generator to the primary processing chamber for re-heating. The primary processing chamber, heat recovery steam generator, and piping that transfers gas between the primary processing chamber and heat recovery steam generator may operate as an enclosed system so that gas is not exhausted to the atmosphere during normal operation.

Optionally, the method may include evacuating the primary processing chamber, heat recovery steam generator, and some or all of the piping that transfers gas between the primary processing chamber and heat recovery steam generator prior to delivering the gas into the enclosed system. The method also may include monitoring at least one system variable with at least one system monitor; providing system variable data one or more monitors to a control system; and using the control system to control the plasma arc torch or torches, the delivery of gas to the primary processing chamber, and/or the mixture of the non-heated gas with the heated gas. The control provided by the control system may be based at least in part on the system variable data. The method also may include controllably shunting some or all of the gas mixture from the input of the heat recovery steam generator to the output of the heat recovery steam generator. The method also may include controllably delivering at least a portion of the gas mixture from the at least one heat recovery steam generator to an input of a second heat recovery steam generator, and returning the gas mixture from an output of the second heat recovery steam generator to the primary processing chamber for re-heating.

DETAILED DESCRIPTION

This disclosure is not limited to the particular systems, devices and methods described, as these may vary. Also, the terminology used in this document is only for the purpose of describing particular versions or embodiments, and it is not intended to limit its scope. As used in the description below and in the appended claims, the singular forms "a," "an," and "the" include plural references unless the context clearly dictates otherwise. Unless defined otherwise, all technical and scientific terms used in this document have the same meanings as commonly understood by one of ordinary skill in the art.

This document is directed to a method and system for generating steam for the generation of electricity and other uses. With the optional exception of a brief start-up period, the method and system may use no fossil fuels such as coal, oil, natural gas, and oil shale, biomass, fuel, coke, petroleum coke, char, tars, wood waste, methanol, ethanol, propanol, propane, butane, and ethane.

Figure 1:
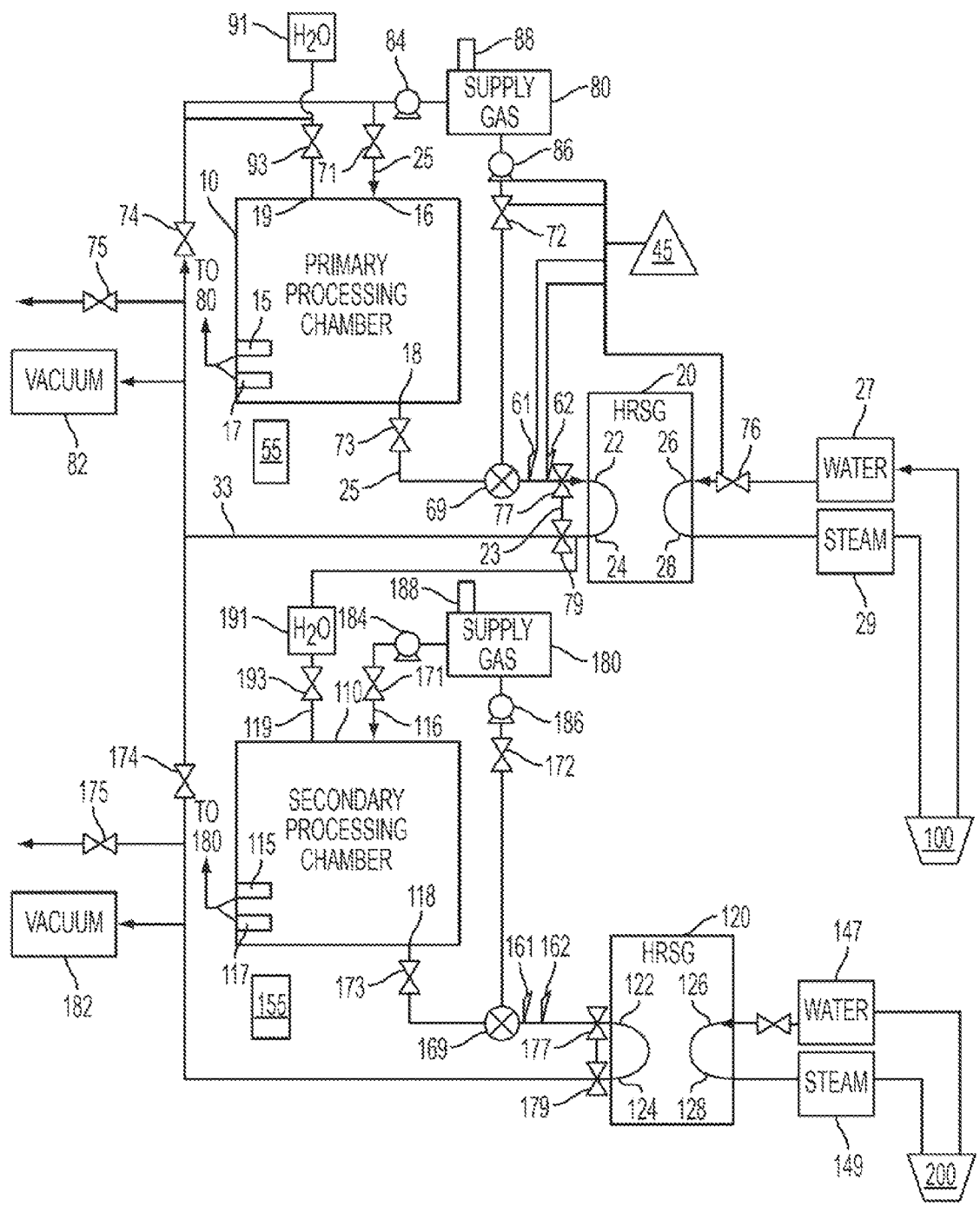
FIG. 1 is a block diagram disclosing elements of a steam production system.

FIG. 1 is a block diagram illustrating a system for the generation of power using steam. As shown, the system includes a primary processing chamber ("PPC") 10 and a heat recovery steam generator ("HRSG") 20. The PPC 10 includes a housing constructed to withstand the internal temperatures generated by one or more plasma arc torches as described below. Depending on the system design requirements, the PPC and/or its housing may include an active cooling system and/or an insulating lining. The PPC 10 includes one or more gas inlets 16 and liquid inlets 19, along with a gas outlet 18. Otherwise the PPC is sealed so that no gases may escape from the PPC. The construction of the PPC housing is sufficient to maintain a vacuum pressure, such as a pressure between 0 pounds per square inch of vacuum (PSIV) to about 14.7 PSIV, without rupturing.

The PPC 10 contains one or more plasma arc torches 15, 17 that are used to heat the PPC 10. For ease of discussion, the terms "torch" or "torches" will be used hereinafter to refer to plasma arc torches. The torches are capable of elevating the temperature in the PPC 10 to the range of about 350° F. to about 36,000° F. (about 180° C. to about 20,000° C.). In various embodiments, the PPC 10 may be a centrifugal unit that can rotate to facilitate mixing and the distribution of the gas in the chamber to the torch. One example of a suitable system is a plasma arc centrifugal treatment ("PACT") system available from Retech Systems, LLC, in Ukiah, Calif. In other embodiments, the PPC 10 may be a non-centrifugal or stationary unit. In other embodiments, the gas inlet 16, the liquid inlet 19, or both may include a nozzle that is positioned at an angle with respect to the chamber walls so that it introduces gas or liquid into the chamber at a direction that creates turbulence and facilitates movement of the gas to the torch's arc.

Figure 2:
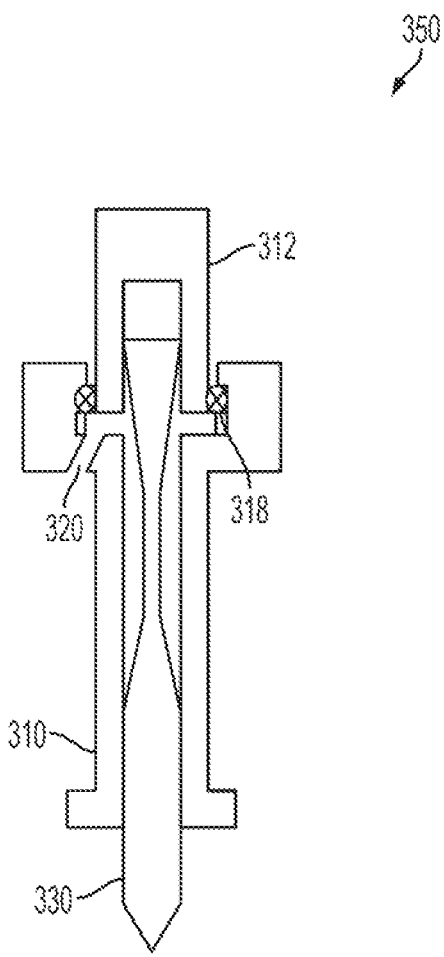
FIG. 2 illustrates elements of a plasma arc torch that may be used with a steam production system.

Various types of plasma torches may be used. For example, FIG. 2 illustrates a non-transferred-arc torch 350, which is effective in heating the supply gas. In non-transferred-arc torches, the torch houses both the anode and the cathode, and the cathode is downstream of the anode. In operation, the arc is drawn within the torch, and the plasma extends beyond the end of the torch as a result of high gas flow through the torch, even though the electrodes are inside the torch. Optionally, the non-transferred arc plasma torches may be fitted with gas backflow collars so that gas is not vented to the atmosphere. Alternatively, the system may use a transferred arc torch, but such a system would also require a raw material to serve as the melt for the torch, as well as a gas cleaning system to remove contaminants from emissions created by melting the raw material. Each torch may include an actuator that is in communication with a process control system 45 to receive operational commands. Additional details of the torch will be provided below.

Returning again to FIG. 1, a supply gas source 80 provides a pressurized gas to be heated in the PPC 10. In various embodiments, the gas is carbon dioxide ($CO_2$), although it may include oxygen, argon, or any other gas or mixture thereof that will not spontaneously combust or autoignite in the presence of the processing temperatures in the PPC 10. In various embodiments, the supply gas may be substantially pure so that materials having an autoignition temperature that is within the operating temperature range of the PPC are not introduced into the PPC. In certain embodiments, the supply gas is substantially pure $CO_2$. In other embodiments, it may be a mixture of $CO_2$ and argon, such as a mixture of 93-95% $CO_2$ and 5-7% argon. Optionally, the supply gas source 80 may be a pressurized tank that holds the supply gas under pressure so that it is ejected into the PPC 10 when appropriate valves are opened. Alternatively, a pump 84 may be used to provide supply gas to the PPC under control at a desired pressure or flow rate. In certain embodiments, the supply gas source 80 includes a pressure release valve 88. A control valve 71 may be opened in order to introduce supply gas into the PPC 10 via a supply line pipe 25 at a desired pressure and/or flow rate. The supply gas flow rate into the PPC 10 can be controlled to optimize the heating within the PPC as well as optimize the heat transfer within the HRSG.

A water source 91 provides water to be heated in the PPC 10. Optionally, a pump and/or valve 93 may be used to supply water to the PPC under control at a desired pressure or flow rate. Either or both of the supply gas control valve 71 and the water supply control valve 93 may include a control valve actuator that is in electronic communication with a process controller 45. The valves may partially or fully open and close in response to commands from the controller, thus providing the ability to control the flow of water and/or gas into the PPC 10.

Any or all of the control valves described in this document (such as control valves 71 and 93) may be programmable, and/or the control valves can include a programmable actuator to open and close the valve in various determined amounts. Any or all of the control valves may be of various types, such as flow control valves, temperature control valves, thermostatic mixing valves, automatic process control valves, or valves of other types including a variety of one-way and two-way valves. The relative amounts of water and $CO_2$ delivered to the PPC may vary, such as approximately 50 percent water and approximately 50 percent $CO_2$. Other combinations are possible.

After the gas and water enter the PPC 10, one or more of the torches 15, 17 may be activated to heat the gas to a desired temperature, such as about 350° F., about 1000° F., about 2000° F., about 2200° F., about 2400° F., about 2500° F., about 2850° F., about 2850° F., about 3500° F., about 5000° F., or any temperature between about 350° F. and about 36,000° F. (about 180° C. to about 20,000° C.).

Optionally, a supply line connects the supply gas source 80 directly to one or more of the torches 15, 17, to provide gas as additional fuel to the torches. Additionally, the PPC may be equipped with a motor that rotates the PPC, such as at a speed of 3 to 20 rotations per minute.

When the water and $CO_2$ enter the PPC in the presence of the torch, the heat and pressure in the PPC cause the water and $CO_2$ to be converted into an $H_2$ and CO exhaust gas mixture. The mixture may be approximately 1 part $H_2$ and 2 parts CO, although other mixtures are possible. Other materials, such as oxygen ($O_2$) may be present in the exhaust gas.

The exhaust gas mixture exits the PPC 10 via an outlet 18 and is directed to a heat recovery steam generator (HRSG) 20 via a delivery pipe 25. A suitable HRSG is a heat-recovery boiler manufactured by NEM (Leiden, the Netherlands), although other heat recovery steam generators can be used. To assist in accommodating the elevated temperatures, it may be beneficial to line portions of the HRSG 20 with ceramic or other suitable refractory material. The HRSG 20 includes an inlet 22 for receiving the heated exhaust gas stream from the PPC 10 and an outlet 24 for discharging a gas stream from the HRSG 20 back to the PPC 10 for re-heating. Alternatively, as described below, some gas may be delivered to a second PPC instead of back to the first PPC.

The HRSG 20 typically receives water from source 27 via a water inlet 26 and uses the heated gas to convert the water to steam 29. The steam is directed to a load 100, such as a steam turbine generator, for the production of electricity, the steam being delivered at the pressure necessitated by the load requirements. In certain embodiments, after the steam operates the turbine, the steam (and/or water resulting from the steam) may be returned to the water source 27 for re-use in the HRSG 20.

In certain embodiments, the system may vary the amount of power that the steam turbine generator produces by controlling the pressure and/or flow of the steam that is used to rotate the turbine 100. The system can do this by controllably varying the temperature and flow of water and heated gas to the HRSG 20, and thus increasing or decreasing the flow and pressure of the steam that exits the HRSG 20.

A process controller 45 comprising a processor and a tangible computer-readable memory may be programmed with instructions to receive process parameters from various points in the system and determine appropriate flow and temperature rates of gas and water to yield the desired result. For example, the controller 45 may receive exhaust and/or supply gas pressure and temperature data from one or more gas sensors 61 and temperature sensors 62 that monitor exhaust gas parameters such as temperature, pressure, and/or flow rate at the PPC outlet 18 and/or at the HRSG inlet 22.

To increase steam production, the process controller 45 may send a command to the PPC supply gas inlet control valve 71 to open wider and deliver more supply gas to the PPC 10. The system may activate a bypass control valve 72 to open and deliver additional unheated supply gas directly from the gas source 80 to the HRSG supply gas inlet 22, optionally via the mixing valve 69. In certain embodiments, the supply gas source 80 may be pressurized, and/or a pump 86 may be used to direct unheated supply gas to the mixing valve 69 at a determined pressure and flow rate. In such embodiments, the supply gas delivered directly from source 80 may reduce the temperature of the exhaust gas from the PPC outlet 18 when the two gas streams mix. Thus, to maintain a desired temperature at the HRSG inlet 22, the process controller 45 may send a command to the PPC to activate one or more additional torches 15 or 17 to increase the temperature of the PPC outlet gas. Alternatively, the added supply gas, while decreasing the temperature of the mixture, can increase the gas mixture partial volume, thereby increasing the efficiency of heat transfer to the HRSG downstream. In certain embodiments, the mixing valve 69 at the junction of the heated supply gas piping and the unheated supply gas piping to promote even mixing of the two gas streams may be a thermostatic mixing valve. In various embodiments, the process controller 45 may also send commands to a water control valve 76 to vary the control of water from the water source 27 into the HRSG's water intake 26.

After the HRSG 20 uses the heat of the exhaust gas mixture to generate steam, the exhaust gas mixture typically has experienced a significant drop in temperature, and some or all of it may be converted back to water and $CO_2$. The HRSG exhaust may include approximately 1 parts $H_2$ and 2 parts CO, along with varying amounts of water and $CO_2$. Other mixtures are possible. The HRSG exhaust can be re-used by being channeled from the HRSG's supply gas outlet 24 back to the PPC 10 via a pipe system 33. Some or all of the water and $CO_2$ may be lost in the process. For example, about 15% of the water and about 50% of the $CO_2$ may be lost in the process. Optionally, instead of delivering the remaining water and $CO_2$ directly to the PPC 10, the system can return the water to the water source 91 and the $CO_2$ to the supply gas source 80 for holding until it is needed. Optionally, one or more control valves 74 and relief valves 75 can be used to controllably deliver the gas to an exhaust if pressure relief is needed. The process controller 45 can deliver commands to the valves' actuators to control opening and closing of the valves 74 and 75.

In another embodiment, the mixture of heated and non-heated gases may be diverted from entry into the HRSG by means of a shunt line 23, controlled by shunt valves 77 and 79 having actuators that are in electronic communication with the process controller 45. This configuration may be used when minimal power output is desired from the turbine.

Optionally, before the system operates, a vacuum source 82 may apply a vacuum to some or all of the system, including the PPC 10, HRSG 20, and all piping between the PPC 10 and HRSG 20 to remove all unwanted gases and other contaminants from the system. The vacuum is suitably applied at any level, such as from 0 pounds per square inch of vacuum (PSIV) to about 14.7 PSIV, that substantially removes any gases that may autoignite in the presence of the PPC's operating temperatures.

In certain embodiments, during operation plasma arc torches 15, 17 in the PPC are powered by electricity that is produced by the steam turbine generator 100. However, the torches 15, 17 will still need power in order to power up on a "cold start" when the turbine generator 100 has not been operating. For such situations, the system may include a generator 55 to be used for cold-starting the torches 15, 17 and other PPC components. Any suitable generator, such as a diesel generator capable of producing 2 MW-5 MW of power, may be used. Alternatively, power from a local power grid may be used to effect the cold start via an automatic transfer switch (ATS).

Optionally, the system may include a secondary processing chamber ("SPC") 110 and a second HRSG 120 to produce additional steam to operate a second turbine 200. In certain embodiments, the SPC and second HRSG can be a self-contained system that contains any or all of the components associated with the PPC and first HRSG, such as its own gas supply source, vacuum pump, water supply, and other components as indicated in FIG. 1. Alternatively, such a second system can be interconnected with the first HRSG 20 so that the supply gas from the outlet 24 of the first HRSG is directed to the SPC inlet 116 and/or second gas source 180 and water source 191. This outlet gas and water may be mixed with gas from the second gas source 180 and water from the second water source 191, processed in the SPC 110, and the resulting exhaust gas used in the second HRSG 120. Various configurations of interdependence may be used. In any of these embodiments, the SPC 110 and second HRSG 120 may be controlled by their own process controller, or more typically, by the same process controller 45 that handles the first set of equipment. The SPC 110 may be a unit having either a centrifugal or non-centrifugal design.

As with the PPC 10, the SPC 110 include one or more torches 115, 117. The SPC also may have a water inlet 119, gas inlet 116 and gas outlet 118. The SPC 110 may be associated with a water control valve 193, a gas control valve 171, an exhaust gas valve 173, and a second vacuum source 182. The second supply gas source 180 may include or be associated with a pump 184 to deliver gas to the PPC 10, a pump 186 and valve 172 to deliver gas directly to the second HRSG, and a pressure release valve 188. A mixing valve 169 may combine exhaust gas from the SPC 110 with supply gas directly from the source. One or more sensors 161, 162 may detect pressure, temperature and/or other information and deliver it to the controller 45. A power source 155 may provide power to the torches 115, 117 during start-up.

The second HRSG 120 includes an inlet 122 for receiving the exhaust gas stream from the SPC 110 and an outlet 124 for discharging the gas stream from the HRSG 120 back to the SPC 110 for re-heating. The second HRSG 120 typically receives water from source 127 via a water inlet 126 and uses the heated gas to convert the water to steam 129. The steam is directed to a load 200, such as a steam turbine generator, for the production of electricity, the steam being delivered at the pressure necessitated by the load requirements. In certain embodiments, after the steam operates the turbine, the steam may be redirected back to the water source 127 for re-use in the HRSG 120. The gas exhausted from the HRSG may be delivered back to SPC 110 and/or PPC 10, optionally by one or more pumps, vacuum sources 182 and valves 174. A relief valve 175 may be used to relieve pressure and/or bleed off unwanted byproducts such as oxygen.

The mixture of heated and non-heated gases may be diverted from entry into the HRSG by means of a shunt line, controlled by shunt valves 177 and 179. This configuration may be used when minimal power output is desired from the turbine.

Thus, the method and system may include multiple stages through which the supply gas stream passes sequentially, with each stage comprising a processing chamber or reactor and a heat recovery steam generator (HRSG), with the HRSG downstream relative to the processing chamber.

As described above, FIG. 2 is a schematic diagram of an exemplary non-transferred plasma arc torch 350. FIG. 2 shows the front electrode 310, rear electrode 312, insulator 318, the arc gas supply 320 and the plasma gas 330.

Figure 3:
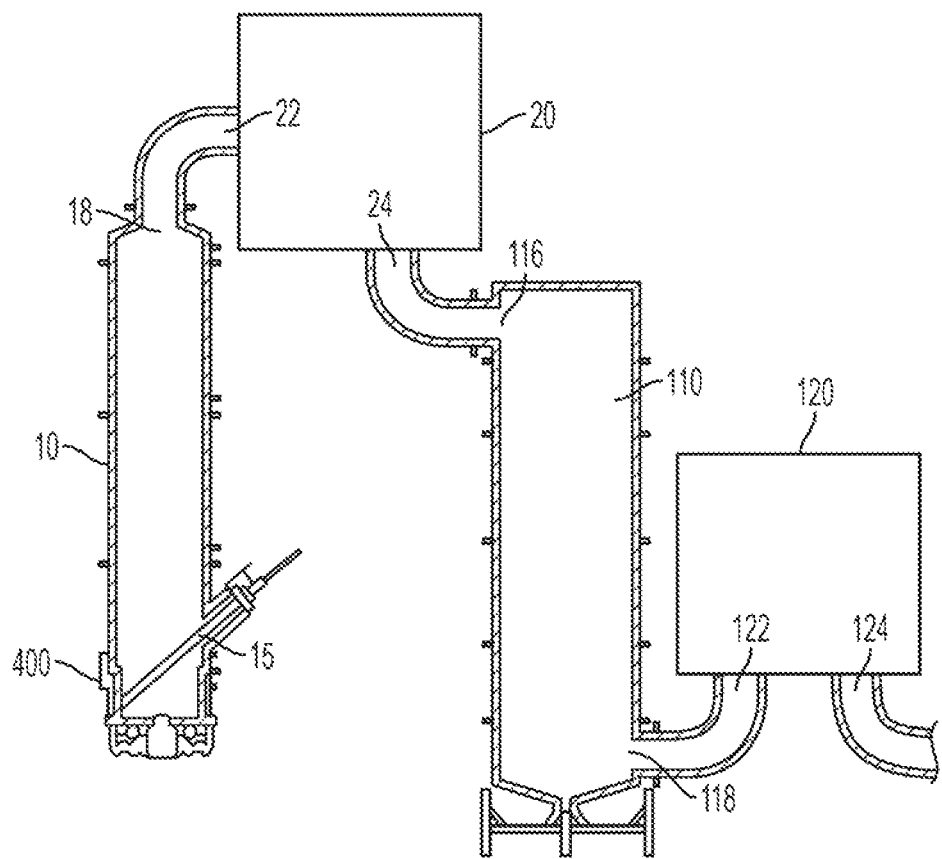
FIG. 3 is a diagram of various elements of a steam production system.

FIG. 3 is a diagram of a vertical embodiment showing the primary processing chamber 10 in fluid communication with the first HRSG 20 having inlet 22 and outlet 24, the secondary processing unit 30 having inlet 32 and outlet 34 and the second HRSG 110 having inlet 116 and outlet 198. The primary processing chamber 10 has a gas outlet 18, a plasma arc torch 15 and an optional centrifuge motor 400.

In various embodiments, the methods and systems described in this document can be used for steam generation without the combustion of fossil fuels and the concommitent exhaust of greenhouse gases such as $CO_2$ and gaseous pollutants such as $SO_x$ and $NO_x$. In certain embodiments, the steam that is produced can be used to power a steam turbine generator for the production of electricity. In other embodiments, the apparatus is suitable for the production of electricity, heat and chilled water in a commercial building or on a marine vessel. In various embodiments, the apparatus can reduce the total annual energy and power costs with respect to combined usage of a commercial building's heating, cooling, ventilation, hot water, and interior lighting systems substantially as compared to a reference building.

Figure 4:
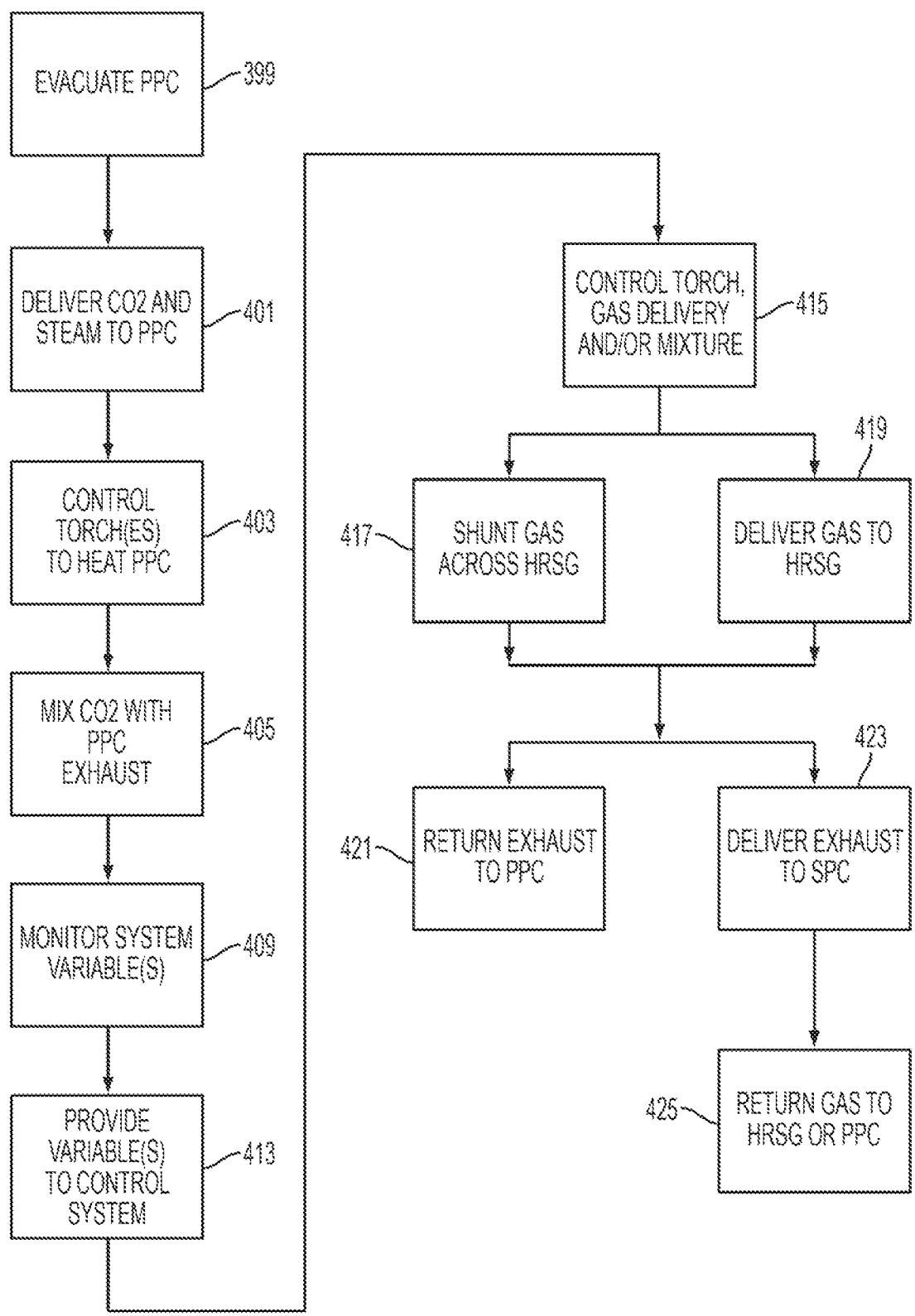
FIG. 4 is a flowchart describing elements of a steam generation process.

FIG. 4 illustrates an example of a steam generation process. In some embodiments, a method of generating steam may include controllably delivering 401 carbon dioxide and water to a primary processing chamber; controlling 403 at least one plasma arc torch to heat the carbon dioxide and water in the primary processing chamber to a temperature that is from about 180° C. to about 36,000° C. and convert the carbon dioxide and water into an exhaust gas mixture comprising hydrogen and carbon monoxide; optionally controllably mixing 405 some volume of non-heated carbon dioxide with the exhaust gas thereby forming a gas mixture; delivering 419 the gas mixture to an input of a heat recovery steam generator; and returning 421 an exhaust from an output of the heat recovery steam generator to the primary processing chamber for re-heating. The primary processing chamber, heat recovery steam generator, and piping that transfers gas between the primary processing chamber and heat recovery steam generator may act as an enclosed system so that gas is not exhausted to the atmosphere during normal operation.

Optionally, the method may include evacuating 399 the primary processing chamber, heat recovery steam generator, and all piping that transfers gas between the primary processing chamber and heat recovery steam generator prior to delivering the gas into the enclosed system. The method also may include monitoring 409 at least one system variable with at least one system monitor; providing 413 system variable data from the at least one monitor to a control system; and using 415 the control system to control the plasma arc torches, the delivery of gas to the primary processing chamber, and/or the mixture of the non-heated gas with the heated gas. For example, the system use spectrographic analysis to analyze the output of the monitors and determine a flow of gas into the primary processing chamber, along with the flow of exhaust from the HRSG. In order to maintain a desired HRSG exhaust combination (such as 1 part $H_2$ to 2 parts CO), the system may increase or decrease the relative amounts of $CO_2$ and $H_2$ that enter the primary processing chamber. The control provided by the control system may be based at least in part on the system variable data. The method also may include controllably shunting 417 some or all of the gas mixture from the input of the heat recovery steam generator to the output of the heat recovery steam generator.

The method also may include controllably delivering 423 at least a portion of the gas mixture from the at least one heat recovery steam generator to an input of a second heat recovery steam generator. Optionally the gas may be heated in a second processing chamber before it is delivered to the second heat recovery steam generator. After the second heat recovery steam generator uses the gas to produce steam, the method may include returning 425 the gas mixture from an output of the second heat recovery steam generator to the primary processing chamber for re-heating.

Figure 5:
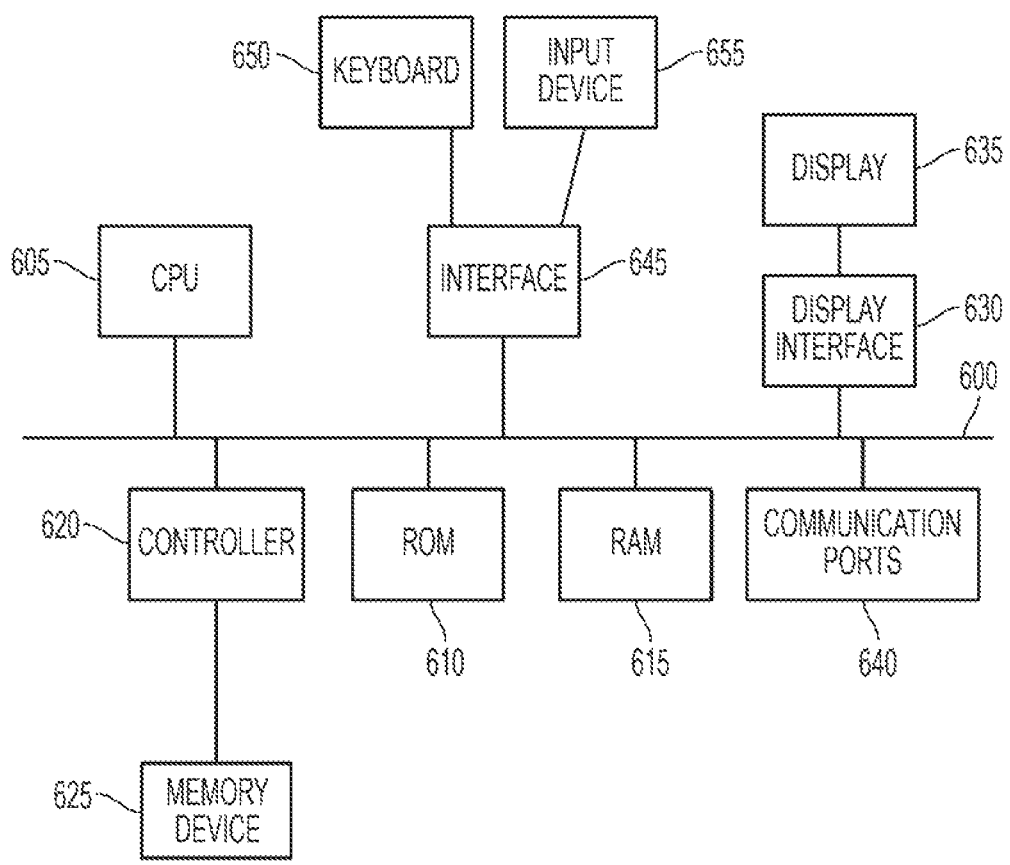
FIG. 5 is a block diagram showing optional elements of a computing device that may process programming instructions.

FIG. 5 depicts a block diagram of internal hardware that may be used to contain or implement the process control components discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 5, is a processing device, computing device or processor as such terms are used within this disclosure. Read only memory (ROM) 610 and random access memory (RAM) 615 constitute examples of memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

EXAMPLE 1

Outlet Temperatures of PPC and SPC Both Equal Approximately 2400° F. (1316° C.)

The outlet temperatures of gas produced by the PPC and SPC may be controlled by selectively turning the plasma arc torches on or off, as well as by controlling the flow rate of gas delivered into the chamber. Given these inputs for a primary processing chamber of volume 5,000 ft$^3$ (141,584 l) and a secondary processing chamber of volume 10,100 ft$^3$ (286,000 l), the outlet temperatures of gas delivered from the primary processing chamber and the secondary processing chamber may both equal approximately 2400° F. (1316° C.).

It is understood that the volume capacity of the processing chambers may range from 1000 ft$^3$ (28,300 l) to 100,000 ft$^3$ (2,830,000 l) or more. The resulting outlet temperatures of the first HRSG and the second HRSG may both be about 50° F. (10° C.). Other temperatures are possible.

Various of the features and functions described above, or alternatives thereof, may be combined into many other different systems or applications. The disclosed embodiments are indented to include not only those specifically described, but also various presently unforeseen or unanticipated alternatives, modifications, variations or improvements that may be made by those skilled in the art.

The invention claimed is:

1. A steam generation system comprising:
   a carbon dioxide source;
   a water source;
   a primary processing chamber, the primary processing chamber comprising:
      a housing,
      a supply gas inlet that is fluidly connected to the carbon dioxide source and configured to receive carbon dioxide from the carbon dioxide source,
      a water supply inlet that is fluidly connected to the water source and configured to receive water from the water source,
      at least one plasma arc torch configured to heat the carbon dioxide and water in the primary processing chamber to a temperature of from about 180° C. to 20,000° C. and convert the carbon dioxide and water into hydrogen and carbon monoxide,
      a first supply gas valve having a first supply gas valve actuator, the first supply gas valve in fluid connection with the carbon dioxide source on an input side and the supply gas inlet on an output side, and
      a primary processing chamber gas outlet;
   a heat recovery steam generator, comprising:
      a heated gas inlet that is fluidly connected to the primary processing chamber gas outlet,
      a second supply gas valve having a second supply gas valve actuator, the second supply gas valve in fluid connection with the carbon dioxide source on an input side and the heated gas inlet on an output side, and
      a gas return;
   a plurality of system monitors, wherein each of the system monitors is configured to provide a data signal indicative of a system variable; and
   an automated control system in data communication with the plurality of system monitors and in operative communication with the system monitors, the first supply gas valve actuator and the second supply gas valve actuator,
   wherein the heat recovery steam generator receives heated gas from the primary processing chamber gas outlet and uses the heated gas to generate steam.

2. The system of claim 1, further comprising a turbine configured to receive the steam and use the steam to generate electrical power.

3. The system of claim 1, further comprising:
   a first pipe fluidly connected to the carbon dioxide source and the primary processing chamber gas inlet;
   a second pipe fluidly connected to the primary processing chamber gas outlet and the heated gas inlet of the heat recovery steam generator;
   a third pipe fluidly connected to the gas return of the heat recovery steam generator and the supply gas inlet of the primary processing chamber; and
   a vacuum source configured to impart a vacuum to each of the pipes, the primary processing chamber, and a gas chamber of the heat recovery steam generator.

4. The system of claim 1, wherein the automated control system comprises:
   a processor and a physical memory device configured to store at least a set of processor readable instructions to direct the activity of the processor.

5. The system of claim 1, wherein the monitors comprise either or both a pressure monitor and a temperature monitor.

6. The system of claim 1, wherein the system monitors comprise a pressure monitor configured to detect a pressure of the heated gas as the heated gas is delivered from the primary processing chamber gas outlet to the heat recovery steam generator.

7. The system of claim 1, wherein the monitors comprise a temperature monitor configured to detect a temperature of the heated gas as the heated gas is delivered from the primary processing chamber to the heated gas inlet of the heat recovery steam generator.

8. The system of claim 1, wherein the first supply gas valve, in response to a command from the automated control system to the first supply gas valve actuator, variably controls a flow of the carbon dioxide into the primary processing chamber; and
   the second supply gas valve, in response to a command from the automated control system to the second supply gas valve actuator, variably controls a flow of carbon dioxide from the carbon dioxide source to the heated gas inlet of the heat recovery steam generator.

9. The system of claim 1, wherein each of the plasma arc torches comprises an actuator in operative communication with the automated control system that, in response to a command from the processor, variably controls activation of its corresponding torch.

10. The system of claim 1, further comprising:
    a first two-way shunt valve having a first two-way shunt valve actuator in operative communication with the automated control system, wherein the first shunt valve is in fluid communication with the primary processing chamber gas outlet and the second supply gas valve on an input side;
    a second two-way shunt valve having a second two-way shunt valve actuator in operative communication with the automated control system, wherein the second shunt valve is in fluid communication with the primary processing chamber supply gas inlet on an output side; and
    a shunt line in fluid communication with the first two-way shunt valve and the second two-way shunt valve,
    wherein the first two-way shunt valve can be controlled by the system controller through the first two-way shunt valve actuator to direct a gas flow from the valve input side to either one of the processed gas input or the shunt line, and the second two-way shunt valve can be controlled by the system controller through the second two-way shunt valve actuator to direct a gas flow from either one of the processed gas return or the shunt and to the second two-way shunt valve output side.

11. The system of claim 1, further comprising a water control valve having a water control valve actuator in operative communication with the control system that, in response to a command from the automated control system, variably controls a flow of the water into the heat recovery steam generator.

12. The system of claim 1, wherein the second supply gas valve comprises a mixing valve.

13. The system of claim 1, further comprising a power source configured to deliver power to at least one of the plasma arc torches during a cold start.

14. The system of claim 13, wherein the power source comprises a generator or an automated transfer switch in electrical communication with an electrical power supply.

15. The system of claim 1, further comprising a second heat recovery steam generator, the second heat recovery steam generator comprising:
    a gas inlet in fluid communication with the gas return of the first heat recovery steam generator;

wherein the second heat recovery steam generator receives gas from the first heat recovery steam generator and uses the gas to generate steam.

16. The system of claim 15, further comprising a connection valve having a connection valve actuator in operative connection with a control system, the connection valve in fluid connection with the processed gas return of the first heat recovery steam generator on an input side, and a second processed gas inlet of the second heat recovery steam generator on an output side.

17. A method, comprising:
controllably delivering carbon dioxide and water to a primary processing chamber;
controlling at least one plasma arc torch to heat the carbon dioxide and water in the primary processing chamber to a temperature that is from about 180° C. to about 36,000° C. and convert the carbon dioxide and water into an exhaust gas mixture comprising hydrogen and carbon monoxide;
delivering the exhaust gas mixture to an input of a heat recovery steam generator; and
returning an exhaust from an output of the heat recovery steam generator to the primary processing chamber for re-heating;
wherein the primary processing chamber, at least one heat recovery steam generator, and all piping that transfers gas between the primary processing chamber and heat recovery steam generator operate as an enclosed system so that gas is not exhausted to the atmosphere during normal operation.

18. The method of 17, further comprising:
evacuating the primary processing chamber, heat recovery steam generator, and all piping that transfers gas between the primary processing chamber and the heat recovery steam generator prior to delivering the gas into the enclosed system.

19. The method of claim 17, further comprising:
monitoring at least one system variable with at least one system monitor;
providing system variable data from the at least one monitor to a control system; and
using the control system to control at least one of the at least one plasma arc torch, the delivery of gas to the primary processing chamber, and the mixture of the non-heated gas with the heated gas;
wherein the control provided by the control system is based at least in part on the system variable data.

20. The method of claim 17, further comprising:
controllably shunting the exhaust gas mixture from the input of the heat recovery steam generator to the output of the heat recovery steam generator.

21. The method of claim 17, further comprising:
controllably delivering at least a portion of the exhaust from the at least one heat recovery steam generator to an input of a second heat recovery steam generator; and
returning gas from an output of the second heat recovery steam generator to the primary processing chamber for re-heating.

* * * * *